Sept. 25, 1928.
O. J. HERB
1,685,359
LUBRICATING DEVICE
Filed April 14, 1924   2 Sheets-Sheet 1
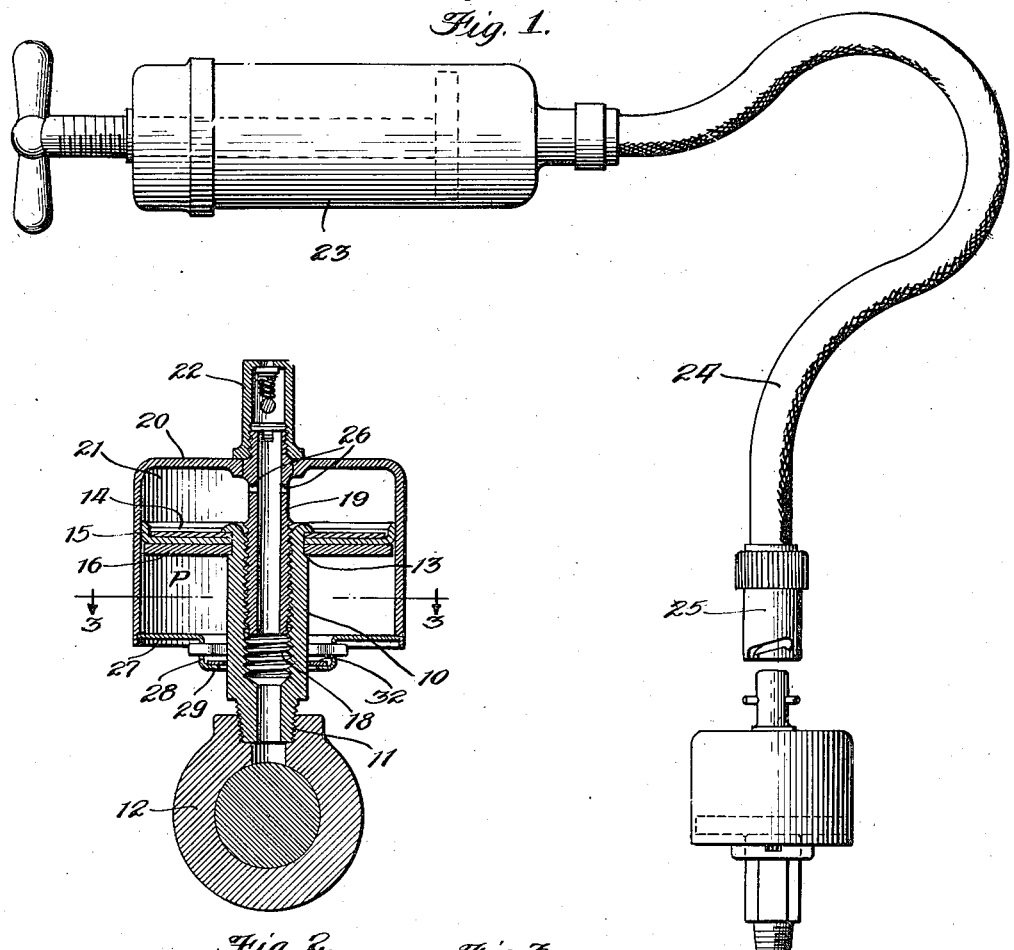
Inventor
Otto J. Herb
Earl X Pierce
Atty.

Sept. 25, 1928.

O. J. HERB

LUBRICATING DEVICE

Filed April 14, 1924

Inventor
Otto J. Herb

Patented Sept. 25, 1928.

1,685,359

UNITED STATES PATENT OFFICE.

OTTO J. HERB, OF CHICAGO, ILLINOIS, ASSIGNOR TO THE BASSICK MANUFACTURING COMPANY, OF CHICAGO, ILLINOIS, A CORPORATION OF ILLINOIS.

LUBRICATING DEVICE.

Application filed April 14, 1924. Serial No. 706,337.

My invention relates to improvements in lubricating devices and is particularly concerned with the provision of a novel type of lubricating device forming a part of a so-called high pressure lubricating system. This lubricating system comprises a plurality of fittings, which are secured to the bearings to be lubricated, and a compressor for supplying lubricant under pressure to the fittings, the compressor being provided with some means for making sealed connection with the fittings.

It is sometimes desirable to provide means operating in conjunction with a fitting for holding a substantial quantity of lubricant which can be forced into the bearing without the necessity of again resorting to the compressor.

One of the objects of my present invention is to provide a lubricating device comprising a grease cup constructed in such manner that lubricant can be forced therefrom into a bearing under considerable pressure, and embodying a fitting which can be connected with a suitably constructed compressor for the purpose of refilling the grease cup, and for the further purpose of supplying lubricant to the bearing under higher pressure than it is practicable to create by the operation of the grease cup.

Another object of my invention is to provide a lubricating device of the character described in which the lubricant is discharged from the grease cup into the bearing by the rotation of one part of the lubricating device relatively to another part thereof.

A still further object of my invention is to provide a lubricating device of the character described with yielding means for holding the two parts of the device against accidental rotation, so that there will be no danger of the two parts rotating relatively to each other except through some manual operation.

My invention further contemplates the provision of a lubricating device as described which is simple of construction, economical to manufacture and easy to operate.

Other objects of my invention will appear as this description progresses, reference being had to the accompanying drawings, in which Figure 1 is a view showing my improved lubricating device in side elevation and also showing, in side elevation, a compressor which may be used for filling my improved lubricating device;

Figure 2 is a central longitudinal section;

Figure 3 is a section taken on line 3—3 of Figure 2;

Throughout the several views, similar reference characters will be used for referring to similar parts, and the several sections are taken looking in the direction of the small arrows.

Figure 4:
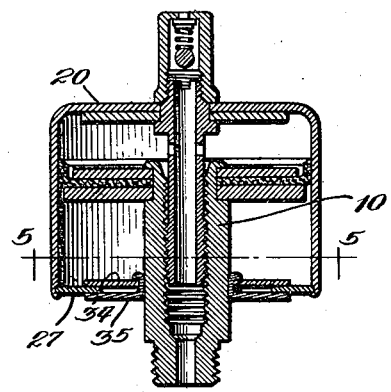
Figure 4 is a view similar to Figure 2 but showing a modified form of my invention.

Referring, for the present, to Figures 1 to 3, inclusive, my improved lubricating device comprises a tubular member 10, one end of which is threaded, as shown at 11, to provide means for securing it to a bearing 12, and the other end of which is off-set, as shown at 13, to provide a shoulder for receiving the thrust of a piston P comprising the face plate 14, the cup leather 15 and the follower plate 16, all of which are centrally apertured for receiving the inner end of the tubular member 10, and held in place by the latter being flanged or swedged over, as shown at 17. The tubular member 10 is internally threaded, as shown at 18, for receiving the tube 19, which is externally threaded, and which carries, adjacent its outer end, the inverted cup 20, the walls of which enclose the periphery of the cup leather 15 and form, with the piston P, a chamber 21 for receiving and holding lubricant.

The lubricant is supplied to the chamber 21 through the fitting 22, which is of well known construction, and through which lubricant is forced by means of the compressor 23, having the flexible discharge conduit 24 and a coupling member 25, all of which are equally well known. The lubricant passing through the fitting 22 will first fill the cavities in the tubular member 10 and the tube 19 and then pass through the openings or ports 26 in the wall of the tube 19 and into the chamber 21.

When the cup is first being filled, the tube 19 will be almost completely unscrewed from the tubular member 10, so that the chamber 21 will have a maximum capacity. When this chamber has been filled any further pressure, exerted upon the lubricant by the compressor 23, will cause the lubricant to be forced into the bearing 12 under the very considerable pressure which can be generated in the compressor 23. When sufficient lubricant has thus been forced into the bearing, the compressor is detached from the fitting. Thereafter, whenever it is desired to supply additional quantities of lubricant to the bearing, all that is necessary is for the operator to rotate the cup portion 20 of the device in the proper direction to cause it to move downwardly under the piston P. This will cause the lubricant in the chamber 21 to be forced through the ports 26 and the ports of the tube 19 and tubular member 10 into the bearing.

For preventing the accidental rotation of the cup 20, due to vibration, or any other extraneous influences, I provide a yielding locking means for holding the cup 20 stationary with respect to the tubular member 10. This means comprises the disk 27, the edge of which is connected with the lower portion of the cup 20. The central portion of the disk 27 is depressed to form the vertical flange 28 and the horizontal flange 29. A pair of oppositely disposed bow springs 30 have their ends 30′ secured in oppositely disposed openings formed in the flange 28 and pass upon opposite sides of the tubular member 10, which is hexagonal in cross section as shown in Figure 3. The bow springs 30 have recesses 31 formed adjacent their centers for receiving the corners of the tubular member 10, as shown in Figure 3. From the above description it will be apparent that when the cup 20 is rotated, the bow springs 30 will be rotated therewith and the recesses 31 will ratchet over the corners of the tubular member 10 and can be brought into co-acting relation with any pair of oppositely disposed corners, so that the cup 20 will be yieldingly held against accidental rotation relative to the member 10.

For the purpose of excluding dust from the space between the disk 27 and the piston P, I provide the disk 32 which has an opening therein corresponding in shape to the exterior of the tubular member 10. This disk 32 is confined between the flange 29 and the bow springs 30 so that it will slide along the tubular member 10 whenever the cup 20 is adjusted in either direction, but will prevent the entrance of dust to the chamber formed between the disk 27 and the piston P.

Figure 5:
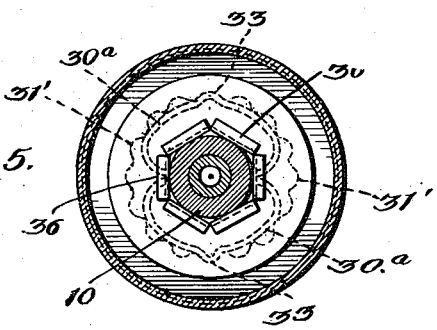
Figure 5 is a section taken on line 5—5 of Figure 4.

The modified form of my invention disclosed in Figures 4 and 5 is similar to that disclosed in Figures 1 to 3, inclusive, except that in this form the disk 27 has a central opening provided with a scalloped edge forming the notches or recesses 31′ which receive the projections 33 formed in the bow springs 30ᵃ. In this embodiment of my invention the bow springs 30ᵃ are confined between the disk 34 and the disk 35, which are positioned upon opposite sides of the disk 27, and clamped thereto, by forming tongues 36 on the disk 35 and turning them up and over the inner edge of the disk 34, as shown in Figures 4 and 5, so as not only to provide means for securing the two disks together on opposite sides of the disk 27, but also to provide a hexagonal opening for receiving the tubular member 10. With the construction just described, when the cup 20 is rotated relatively to the tubular member 10, the projections 33 ratchet in and out of the recesses or notches 31′ and lock the cup in any adjusted position.

Figure 6:
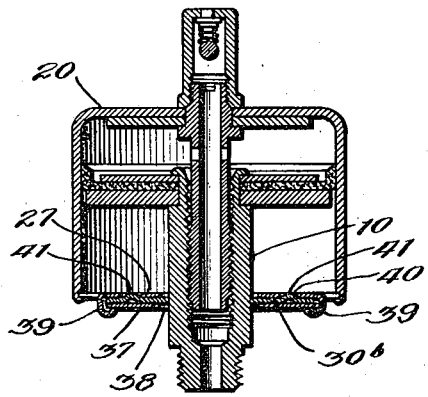
Figures 6 and 7 are views similar to Figures 4 and 5, respectively, but showing another embodiment of my invention.
Figure 7:
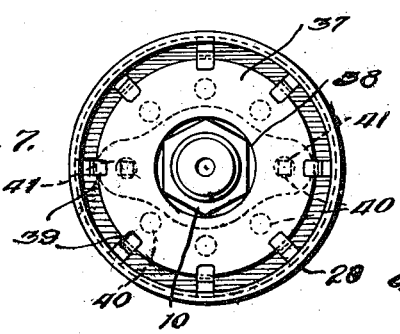

In that embodiment of my invention illustrated in Figures 6 and 7, I make use of a spring locking disk 30ᵇ which is confined between the central portion of the disk 27, and a second disk 37, which is provided with a central circular aperture 38 permitting the cup 20 to be rotated about the tubular member 10. Tongues 39 are struck from the disk 27 and bent downwardly and then upwardly against the outer face of the disk 37, so as to confine the spring disk 30ᵇ between the disks 27 and 37.

The disk 27 is provided with a plurality of openings 40 which are adapted to receive the circular projections 41 pressed upwardly from the spring disk 30ᵇ. The last mentioned disk has an opening corresponding in shape to the cross section of the tubular member 10, so that, while it can slide along the tubular member 10, it can not rotate thereon. In using the lubricating device just described the operator turns the cup until he feels or hears the projections 41 snap into the openings 40, whereupon he knows that the cup 20 is locked against accidental rotation relative to the tubular member 10.

While I have described the details of construction of the preferred embodiments of my invention, it is to be clearly understood that my invention is not limited to these details of construction, but is capable of other adaptations and modifications within the scope of the appended claims.

Having thus described my invention, what I claim is:

1. A lubricating device comprising a fixed tubular member, a fixed piston at the upper end thereof, an inverted cup fitting over said piston, an annular diaphragm mounted on the lower edge of said cup and forming a seal with said member, said diaphragm and member having resilient means mounted on one and engaging the other to lock them against accidental displacement by vibration, and means extending along the axis of said cup inside said member for forcing the cup down over the member.

2. A lubricating device comprising a tubular member having one end shaped to be fastened in place in a bearing, a fixed piston thereon at the other end, a sleeve threaded inside said member, an inverted cup rigid with the outer end of said sleeve and fitted over said piston, said sleeve having lateral openings communicating with the interior of said cup near the end connected to said cup, and means for filling said device through the outer end of said sleeve.

3. A lubricating device comprising a tubular member having one end shaped to be fastened in place in a bearing, a piston fixed at the other end thereof, a sleeve threaded inside said member and having openings above said piston, an inverted cup rigid with the outer end of said sleeve and fitting over said piston, and check valved means for supplying lubricant to said sleeve, said means being threaded at the extremity of said sleeve.

In witness whereof, I hereunto subscribe my name this 11th day of April, 1924.

OTTO J. HERB.